Patented Jan. 13, 1948

2,434,284

UNITED STATES PATENT OFFICE 2,434,284

METHOD OF TREATING TIN-CONTAINING MATERIALS

Irving E. Muskat, Glenside, Pa., assignor to Vulcan Detinning Company, Sewaren, N. J., a corporation of New Jersey No Drawing. Application July 12, 1943, Serial No. 494,352

19 Claims. (Cl. 23—53)

This invention is directed to the treatment of tin ores and material containing tin or tin oxide for the recovery of tin therefrom and is particularly applicable to a process in which a tin or (including concentrated and unconcentrated ores) is subjected to a reduction treatment in the presence of a reducing agent capable of reducing tin oxide to metallic tin, followed by treatment with an aqueous alkali metal hydroxide such as sodium hydroxide. In such a process it is often observed that silica, antimony and arsenic are dissolved in the alkali metal hydroxide to a serious extent, thereby consuming an objectionable quantity of sodium hydroxide and also making recovery of substantially pure tin from the solution more difficult. Moreover, only a portion of the caustic in solution is found to react with the tin and, consequently, a large excess of caustic solution is normally required for a suitable extraction.

In accordance with the present invention I have been able to avoid many of these difficulties and to conduct the treatment without the use of the large excesses of alkali metal hydroxide required in other processes. By the present process a tin ore or other material containing metallic tin or an ore or tin oxide composition which has been subjected to a reduction treatment is reacted with a solution of an alkali metal hydroxide in the presence of a soluble nitrate or nitrite, the solution being of a concentration such that a large portion of the tin is converted to a solid water soluble state preferably in the form of hydrated alkali metal stannate which remains in the solid state together with the gangue of the ore. In order to effect this result the aqueous caustic solution used should contain at least 150 grams of NaOH per liter of solution or equivalently effective amount of other alkali metal hydroxide. The reaction is comparatively rapid and is substantially completed before large portions of silica and other impurities begin to be converted to a water-soluble state. The reaction product thus obtained may be in the form of a comparatively dry powder, a wet mud or a slurry depending upon the amount of water present therein. For most purposes it is found desirable to limit the amount of water present to ensure conversion of the reaction mixture to a solid mass which is either comparatively dry to touch or is in the form of a damp mud as distinguished from an aqueous suspension or slurry.

Thus it is found that upon treatment of a reduced tin ore of good reactivity with an aqueous solution of NaOH containing at least 150 grams of NaOH per liter of solution and a quantity of an oxidizing agent such as sodium nitrate a rapid reaction occurs with evolution of heat. If the amount of solution used is not greatly in excess of the amount theoretically required to convert the tin to a stannate the mixture is rapidly converted to a solid mass. Usually the temperature of operation approximates that at which water vaporizes and in such cases substantial evaporation of water may occur during the process. If this water is not replaced or only a portion thereof is replaced, the final reaction product is a pulverulent mass which feels dry to touch. If enough of the water is replaced, however, a mud may be secured or even a slurry produced. Likewise, if a several-fold excess of caustic solution is used, the amount of water therein may be sufficient to produce a mud or slurry. The reaction product thus obtained may be extracted with water or an aqueous solution containing sodium stannate, sodium hydroxide, alkali metal sulphide, acids, etc. to form a solution of a tin compound such as sodium stannate stannic chloride, etc., and the solution treated to recover the tin therefrom.

The process herein contemplated is effective for treatment of various tin ores or concentrates particularly oxide ores containing at least 5 per cent tin, including both high grade and low grade ores. It is especially adapted to the treatment of the low-grade tin ores containing 15 to 35 per cent or less of tin, which have not been amenable to treatment prior to the present invention. Such ores often contain 5 per cent or more of iron in addition to silica, arsenic, antimony, sulphur, etc. If sulphur is present in excessive amounts, it is sometimes desirable to roast the ore prior to treatment. On the other hand, ores containing small quantities of sulphur may be treated without roasting, since some sulphur is removed during the reduction treatment.

The reduction treatment of the ore may be effected by heating the ore in a pulverized state, for example, minus 100 or 200 mesh, in the presence of a carbonaceous reducing agent such as coal, carbon, coke, carbon monoxide, natural gas, etc. or other reducing agents such as hydrogen, in order to convert the tin to an aqueous alkali-soluble condition. This treatment should be conducted at a temperature sufficiently high to permit a major part or all of the tin to be converted to an aqueous alkali-soluble state. However, the temperature should not be so high that substantial fusion occurs and a molten pool of ore, slag, metallic tin or other molten material is formed, The exact temperature which may be utilized is dependent largely upon the nature of the ore undergoing treatment. Thus some ores fuse or melt to a very serious extent at a temperature of 1600° F. On the other hand, other ores may be subjected to temperatures as high as 1800 or 1900° F. without encountering serious fusion. Primarily the ore should be treated at a temperature such that a material is produced from which a major portion of the tin may be extracted or converted with alkali metal hydroxide in the presence or absence of the alkali metal nitrate or nitrite. Slight amounts of fusion resulting in some sintering of the ore undergoing reduction may be tolerated in most cases. On the other hand, fusion to an extent such that pools of molten material are formed is not normally permissible. In general, satisfactory results are usually obtained by conducting the reduction at a temperature above about 1600° F. but below the temperature at which the ore is converted to a molten pool. Temperatures of 1650 to 1900° F. are usually resorted to. The reduction is conducted in the presence of a reducing agent such as carbon monoxide, hydrogen, coal, coke, charcoal, etc.

The amount of such reducing agent should at least be sufficient to reduce the tin to an aqueous alkali-soluble state and in some cases it may be possible to operate without use of an excess of carbonaceous agent. Often, however, it is found that tin ores fuse during the reduction treatment to an extent such that the ore clinkers or "balls up" and tin extraction is rendered difficult or impossible. It has been found that this may be avoided by use of a substantial excess of a solid carbonaceous reducing agent. Thus where fusion of the ore is found to be a problem encountered in the reduction, the amount of solid carbonaceous agent used should exceed two times the amount theoretically required to reduce the tin in the ore to metallic state. Generally at least about 15 per cent of solid carbonaceous agent based upon the weight of the ore is used for most purposes. Where sintering has been encountered and addition of further carbon appears unfeasible or undesirable, it is also possible to avoid or minimize sintering by addition of an inert solid to the ore. For example, silica, finely divided tailings from concentrating operations, or other similar solid, may be added to minimize sintering.

The time of reduction of the ore should be sufficient to ensure conversion of the tin to an aqueous alkali-soluble state. Where an excess of carbon is used it is generally essential to interrupt the reduction within a proper period since otherwise some quantity of the tin converted to an aqueous alkali-soluble state may be converted to an aqueous alkali-insoluble state possibly due to reduction of iron and formation of iron-tin alloys. Generally treatment for 10 to 90 minutes above 1600° F., for example 1600 to 2000° F., is sufficient. Where the temperature is below 1600° F., for example 1400 to 1600° F., the reaction is somewhat slower and a treatment of two or three hours or even longer may be required.

The ore after reduction is completed, may be cooled in a nonoxidizing atmosphere to prevent substantial reoxidation of the tin. The treated ore is generally found to be a black or dark colored pulverulent or granular mass. Sometimes it may be more or less clinkered or caked due to slight local fusion and, occasionally it may require pulverizing or grinding treatment prior to or in conjunction with the alkali treatment. The exact nature of the reducing reaction and whether the tin is actually reduced to metallic state is unknown. At all events, however, the treated ore is substantially more amenable to alkali treatment than is the untreated ore.

The resulting ore is then reacted with aqueous alkali metal hydroxide of such concentration that an alkali metal tin salt, probably alkali metal stannate, is formed and precipitated. Generally, such a solution should contain at least 150 grams per liter of NaOH or its equivalent and in order to ensure substantially complete reaction within a short period of time, a normally liquid solution containing at least 250 grams of NaOH per liter of solution is preferable. In order to increase the rate of reaction the process is conducted in the presence of a soluble nitrate or nitrite such as alkali metal nitrate or nitrite, including sodium or potassium nitrate or nitrite. While some quantity of nitrate or nitrite is essential in order to speed the reaction and permit it to occur without external heat, an excessive amount is undesirable where the solution is to be electrolyzed, since such excess materially decreases the efficiency of the electrodeposition. Generally where the resulting solution is to be electrolyzed 5 to 7 moles of alkali metal hydroxide is used per mole of sodium nitrate or nitrite. The nitrate or nitrite may be introduced by addition of the sodium nitrate or nitrite as such or compounds capable of forming an alkali metal nitrite or nitrate, such as nitrous or nitric acid, may be added to the sodium hydroxide solution.

The reaction of the aqueous alkali metal hydroxide solution with the ore is generally conducted at a temperature of at least 75° C. The reaction is exothermic and where the ore undergoing treatment is sufficiently reactive, it may often be conducted simply and effectively by operating under conditions such that the heat of the reaction maintains the temperature sufficiently high to carry on the reaction during at least the later stage of the conversion of the tin to stannate. Many ores are sufficiently active to permit treatment in this manner and in such cases heat is applied only during the initial period of treatment or at least is discontinued while substantial heat is being evolved from the reaction and before tin extraction is complete. Moreover, if a solution containing 350 grams per liter of NaOH is used, even initial heating may be dispensed with in treatment of many ores. In accordance with this process the reaction mixture cools to below 75° C. when all or most of the tin is reacted with the caustic, thereby effectively preventing reaction of excess or unused caustic with other impurities. This serves as a more or less automatic means of securing a selective reaction upon the tin while avoiding excessive reaction upon the impurities such as silica, antimony, arsenic, etc.

During the process substantial evaporation and evolution of ammonia occurs. Simultaneously solid sodium stannate or similar solid tin compound is formed and precipitated and some water may be evaporated. In consequence the reaction mixture is rapidly converted to a solid mass unless a large excess of sodium hydroxide solution has been used. Occasionally it may be desirable to add water or caustic solution in order to make up partially or completely for evaporation which occurs and to prevent the mixture from overheating. The amount of caustic solution required for the process is dependent upon the nature of the final reaction mixture desired. Thus if a stoichiometric amount of caustic is used a dry powder is normally secured as a final product. On the other hand, if a five or tenfold excess of aqueous NaOH solution is used a slurry may be secured. For most purposes it is found preferable to use about 0.75 to 2 times the theoretical NaOH required to react with the tin in the ore undergoing treatment. By this means a rapid reaction is secured and the resulting product is usually in the form of a mud or powder.

The concentration of alkali metal hydroxide should be sufficient to ensure production of solid alkali metal stannate but should not be so great that the solution is not liquid at the temperature of operation. Generally a solution containing 150 grams per liter or more of NaOH is suitable provided it is liquid at the temperature of treatment.

The reaction mixture thus obtained is treated to recover the sodium stannate. Generally it is found desirable to permit the reaction mixture to stand or "age" for 12 to 24 hours prior to extraction in order to insure optimum extraction. The recovery of the stannate or tin compound is generally effected by extracting the mass with water. If desired, the extraction may be conducted with the aid or in the presence of other agents such as sodium or potassium hydroxide, sodium sulphide, sodium stannate, sodium stannite, potassium stannate, etc. The temperature of extraction should be maintained sufficiently low to prevent or at least minimize hydrolysis of sodium stannate. Where a substantial concentration of free sodium hydroxide is present, it is generally undesirable to utilize temperatures above 75° C. since the caustic may tend to dissolve silica to an undesirable degree. Usually a temperature of 15 to 60° C. is found suitable.

The amount of water used in the extraction is dependent upon the concentration of solution desired. Usually the amount of water is limited to produce a substantially saturated or highly concentrated solution containing at least 100 grams of dissolved tin per liter of solution. Thereby extraction of impurities may be minimized.

The resulting solution is found to be a sodium stannate solution of comparatively high purity, which may contain some unreacted oxidizing agent. It may be treated to recover sodium stannate by crystallization. This stannate may be smelted with a reducing agent such as carbon or carbon monoxide or hydrogen to produce metallic tin.

Moreover, the solution may be electrolyzed to form electrolytic tin. In accordance with a further method the solution may be hydrolyzed to precipitate stannic oxide which may be smelted with a reducing agent such as hydrogen or carbon to form metallic tin of high purity.

Example 1

A quantity of Mexican tin oxide ore containing 23 per cent tin, 36 per cent iron and 20 per cent of silica, as well as small amounts of antimony, was mixed with 25 per cent by weight of coal and heated in a multiple-hearth Wedge-type furnace at 1750° F. for about one-half hour. The reduced ore was mixed with 1.5 times the stoichiometric quantity of a solution containing 200 grams per liter of NaOH and 85 grams per liter of sodium nitrate required to react with the tin in the reduced ore to form sodium stannate and the temperature raised to 70° C. whereupon heating was discontinued. The reaction initiated and took place vigorously for 10 to 15 minutes with evolution of heat and ammonia and the temperature rose to about 105° C., a pulverized mass containing crystallized sodium stannate hydrate being obtained. Thereafter the mixture was permitted to cool. This mass was leached with an amount of water necessary to extract a saturated solution of sodium stannate at a temperature about 20° C.–30° C. This solution contained less than 0.5 per cent of silica based upon the weight of tin therein. Thereafter, the solution was electrolyzed using a cell containing carbon anodes and iron cathodes at about 2.2 volts to recover metallic tin.

Example 2

A quantity of an ore of Bolivian origin containing 27 per cent tin, 19 per cent iron, 8 per cent silica, and some antimony and arsenic was mixed with 25 per cent by weight of coal and reduced as in Example 1. The reduced ore was mixed with a solution containing 200 grams per liter of NaOH and 140 grams per liter of sodium nitrate in an amount about 1.5 times the theoretical required for conversion of the tin in the ore to stannate. The mixture was heated to 80° C. and since the ore was less reactive than the ore of Example 1, heating was continued periodically until ammonia evolution substantially ceased, whereupon the mixture which was a solid powder was allowed to cool. The resulting mixture was extracted with water at 40° C. to form a relatively pure solution of sodium stannate containing less than 0.5 per cent silica. A portion of the sodium stannate was crystallized from solution and heated at 700° C. in an atmosphere of carbon monoxide. The product was cooled, and sodium carbonate leached out, leaving powdered metallic tin.

Example 3

The process of Example 1 was repeated using a solution containing 175 grams of NaOH, 100 grams per liter of NaNO$_3$ and 20 grams per liter of NaNO$_2$.

Example 4

The process of Example 1 was repeated using a solution containing 250 grams of NaOH and 70 grams of sodium nitrite, per liter of solution. The reaction occurred vigorously after initiation and continued without application of external heat. The reaction product was treated as in Example 1.

Example 5

The process of Example 2 was repeated using a solution containing 350 grams of NaOH and 112 grams of sodium nitrate per liter of solution. Prior to treatment with the caustic the ore after reduction was ball milled to minus 200 mesh. The NaOH solution was then added in amount equal to 1.25 times the theoretical NaOH required for reaction with the tin in the ore. The reaction initiated without heating and the temperature rose to 105° C. The reaction mixture became converted to a solid pulverulent mass and after cooling was treated for recovery of tin as in Example 1.

While the invention has been described with reference to the use of sodium hydroxide, other alkali metal hydroxides such as potassium hydroxide or lithium hydroxide may be used in conjunction or in lieu thereof. Moreover, the invention is not limited to treatment in ores, but may be applied to other tin-containing material which contains at least 5 per cent and preferably 15 per cent or more of metallic tin.

Although the present invention has been described with particular reference to the specific details of certain specific embodiments thereof, it is not intended that such details shall be regarded as limitations upon the scope of the invention, except insofar as included in the accompanying claims. This application is a continuation in part of my copending applications Serial No. 470,824, filed December 31, 1942, now abandoned, Serial No. 469,373, filed December 17, 1942, now forfeited, and Serial No. 494,351, filed July 12, 1943, to be patented of even date herewith January 13, 1948, as Patent No. 2,434,283.

I claim:

1. A method comprising heating a mixture of finely divided low grade tin ore, containing about 5 to 35 per cent of tin and a substantial amount of metallic impurities, and at least about 15 per cent by weight of a solid carbonaceous reducing agent, based on the weight of the ore, at a temperature above about 1600° F. but below the temperature at which the ore fuses under conditions such that reduced ore containing tin in dispersed small particles in a form soluble in aqueous alkali solution is produced, cooling the reduced ore, and then reacting the product of such treatment containing the said soluble tin at a temperature of above about 75° C. with a limited amount of an aqueous solution of an alkali metal hydroxide, containing at least about 250 grams of alkali metal hydroxide per liter of solution and a substantial quanitty of an oxidizing agent capable of oxidizing metallic tin in an alkaline medium of the group consisting of soluble nitrates and nitrites so that the reaction mixture is converted into a substantially solid mass containing an alkali metal stannate, and leaching the alkali metal stannate from the mass.

2. A method comprising heating a mixture of finely divided low grade tin ore, containing about 5 to 35 per cent of tin and a substantial amount of metallic impurities, and at least about 15 per cent by weight of a solid carbonaceous reducing agent, based on the weight of the ore, at a temperature above about 1600° F. but below the temperature at which the ore fuses under conditions such that reduced ore containing tin in dispersed small particles in a form soluble in aqueous alkali solution is produced, cooling the reduced ore, and then reacting the product of such treatment containing the said soluble tin at a temperature of above about 75° C. with a limited amount of an aqueous solution of an alkali metal hydroxide, containing at least about 250 grams of alkali metal hydroxide per liter of solution and a substantial quantity of an alkali metal nitrite so that the reaction mixture is converted into a substantially solid mass containing an alkali metal stannate, and leaching the alkali metal stannate from the mass.

3. A method comprising heating a mixture of finely divided low grade tin ore, containing about 5 to 35 per cent of tin and a substantial amount of metallic impurities, and at least about 15 per cent by weight of a solid carbonaceous reducing agent, based on the weight of the ore, at a temperature above about 1600° F. but below the temperature at which the ore fuses under conditions such that reduced ore containing tin in dispersed small particles in a form soluble in aqueous alkali solution is produced, cooling the reduced ore, and then reacting the product of such treatment containing the said soluble tin at a temperature of above about 75° C. with a limited amount of an aqueous solution of an alkali metal hydroxide, containing at least about 250 grams of alkali metal hydroxide per liter of solution and a substantial quantity of an alkali metal nitrite so that the reaction mixture is converted into a substantially solid mass containing an alkali metal stannate, and leaching the alkali metal stannate from the mass.

4. A method comprising heating a mixture of finely divided low grade tin ore, containing about 5 to 35 per cent of tin and a substantial amount of metallic impurities, and at least about 15 per cent by weight of a solid carbonaceous reducing agent, based on the weight of the ore, at a temperature above about 1600° F. but below the temperature at which the ore fuses under conditions such that reduced ore containing tin in dispersed small particles in a form soluble in aqueous alkali solution is produced, cooling the reduced ore, and then reacting the product of such treatment containing the said soluble tin at a temperature of above about 75° C. with a limited amount of an aqueous solution of an alkali metal hydroxide, containing at least about 150 grams of alkali metal hydroxide per liter of solution and a substantial quantity of an oxidizing agent capable of oxidizing metallic tin in an alkaline medium of the group consisting of soluble nitrates and nitrites so that the reaction mixture is converted into a substantially solid mass containing an alkali metal stannate, and leaching the alkali metal stannate from the mass.

5. A method comprising heating a mixture of finely divided low grade tin ore, containing about 5 to 35 per cent of tin and a substantial amount of metallic impurities, and at least about 15 per cent by weight of a solid carbonaceous reducing agent, based on the weight of the ore, at a temperature above about 1600° F. but below the temperature at which the ore fuses under conditions such that reduced ore containing tin in dispersed small particles in a form soluble in aqueous alkali solution is produced, discontinuing heating before a substantial portion of the aqueous alkali-soluble tin becomes aqueous alkali-insoluble, cooling the reduced ore, and then reacting the product of such treatment containing the said soluble tin at a temperature of above about 75° C. with a limited amount of an aqueous solution of an alkali metal hydroxide, containing at least about 250 grams of alkali metal hydroxide per liter of solution and a substantial quantity of an oxidizing agent capable of oxidizing metallic tin in an alkaline medium of the group consisting of soluble nitrates and nitrites so that the reaction mixture is converted into a substantially solid mass containing an alkali metal stannate, and leaching the alkali metal stannate from the mass.

6. A method comprising heating a mixture of finely divided low grade tin ore, containing about 5 to 35 per cent of tin and a substantial amount of metallic impurities, and at least about 15 per cent by weight of a solid carbonaceous reducing agent, based on the weight of the ore, at a temperature above about 1600° F. but below the temperature at which the ore fuses under conditions such that reduced ore containing tin in dispersed small particles in a form soluble in aqueous alkali solution is produced, cooling and pulverizing the reduced ore, and then reacting the product of such treatment containing the said soluble tin at a temperature of above about 75° C. with a limited amount of an aqueous solution of an alkali metal hydroxide, containing at least about 250 grams of alkali metal hydroxide per liter of solution and a substantial quantity of an oxidizing agent capable of oxidizing metallic tin in an alkaline medium of the group consisting of soluble nitrates and nitrites so that the reaction mixture is converted into a substantially solid mass containing an alkali metal stannate, and leaching the alkali metal stannate from the mass.

7. The process set forth in claim 1 wherein the amount of alkali metal hydroxide used is in the order of about 250 to 350 grams per liter of solution and the amount of oxidizing agent used is in proportion of 1 mole per 5 to 7 moles of alkali metal hydroxide.

8. A method which comprises reacting a reduced, low grade tin ore containing tin in a form soluble in aqueous alkali solution with a limited amount of an aqueous sodium hydroxide solution containing at least about 150 grams of sodium hydroxide per liter of solution at a temperature of not less than about 75° C., and in the presence of an oxidizing agent capable of oxidizing metallic tin in an alkaline medium of the class consisting of soluble nitrates and nitrites so as to form sodium stannate in solid state in said ore, adding water to the reaction mass to dissolve the sodium stannate and removing the resulting solution therefrom.

9. A method which comprises heating a low grade tin ore under reducing conditions to increase the solubility of the tin content thereof in an aqueous solution of an alkali metal hydroxide, and reacting the said reduced ore at a temperature above 75° C. and in the presence of an alkali metal nitrate, with an aqueous alkali metal hydroxide solution of a concentration and in an amount so as to form a solid, water-soluble tin compound in said ore, and leaching the water-soluble tin compound from the ore.

10. A method which comprises heating a low grade tin oxide ore under reducing conditions to increase the solubility of the tin content thereof in an aqueous alkali metal hydroxide solution, and reacting the said reduced ore at a temperature above 75° C. with an aqueous sodium hydroxide solution containing at least about 150 grams of sodium hydroxide per liter of solution and sodium nitrate in the proportion of one mole of sodium nitrate per 5 to 7 moles of sodium hydroxide, the amount of aqueous sodium hydroxide solution being so limited that the reaction mixture is converted to a substantially solid mass containing sodium stannate, and extracting the mass with water to recover the stannate.

11. A method which comprises heating a low grade tin ore containing silica in the presence of at least twice the amount of carbon required to reduce the tin content thereof to an aqueous alkali-soluble state, at a temperature above about 1400° F. but below the temperature at which the ore becomes a fused mass, reacting the said reduced ore at a temperature above 75° C., in the presence of an alkali metal nitrate, with an aqueous alkali metal hydroxide solution of a concentration and in an amount such that a substantially solid mass containing an alkali metal stannate is formed, adding water to the reaction product to dissolve the stannate and removing the resulting solution.

12. A method which comprises heating a finely divided low grade tin ore under reducing conditions to increase the aqueous alkali solubility of the tin therein, reacting the said reduced ore with a limited amount of an aqueous sodium hydroxide solution containing at least about 250 grams of sodium hydroxide per liter of solution and an oxidizing agent capable of oxidizing metallic tin in an alkaline medium of the group consisting of soluble nitrates and nitrites to initiate the reaction at a temperature above about 75° C., permitting the reaction temperature to be maintained by means of the heat evolved during the reaction so that after the reaction between the tin and sodium hydroxide is substantially completed a substantially solid mass containing sodium stannate is formed, and leaching the mass with water to remove the stannate therefrom.

13. The process of claim 12 wherein the amount of sodium hydroxide used is in the order of about 350 grams per liter of solution and the amount of oxidizing agent used is in proportion of 1 mole per 5 to 7 moles of sodium hydroxide.

14. A method which comprises reacting a low grade tin ore containing tin in a form soluble in an aqueous alkali metal hydroxide solution and silica with a limited amount of an aqueous alkali metal hydroxide solution containing at least about 150 grams of alkali metal hydroxide per liter of solution in the presence of an oxidizing agent capable of oxidizing metallic tin in an alkaline medium of the group consisting of soluble nitrates and nitrites and at a temperature during at least a portion of the reaction, of at least about 75° C., so as to form a substantially solid mass containing alkali metal stannate throughout said ore, and leaching the stannate from said ore.

15. A method which comprises reacting a low grade tin ore containing tin in a form soluble in an aqueous alkali metal hydroxide solution with a limited amount of an aqueous sodium hydroxide solution containing at least about 150 grams of sodium hydroxide per liter of solution at a temperature of not less than about 75° C. and in the presence of an oxidizing agent capable of oxidizing metallic tin in an alkaline medium of the group consisting of soluble nitrates and nitrites so as to form a substantially solid reaction mixture containing sodium stannate, and leaching the stannate from the reaction mixture.

16. A method which comprises reacting a low grade tin ore containing tin in a form soluble in an aqueous alkali metal hydroxide solution with a limited amount of an aqueous sodium hydroxide solution containing at least about 250 grams of sodium hydroxide per liter of solution at a temperature of not less than about 75° C. and in the presence of an oxidizing agent capable of oxidizing metallic tin in an alkaline medium of the group consisting of soluble nitrates and nitrites so as to form a substantially solid reaction mixture containing sodium stannate, and leaching the stannate from the reaction mixture.

17. The process of claim 16 wherein the oxidizing agent is an alkali metal nitrite.

18. The process of claim 16 wherein the oxidizing agent is an alkali metal nitrate and is present in proportions of 1 mole per 5 to 7 moles of NaOH.

19. A method which comprises reacting a low grade tin ore containing at least about 5 per cent of tin in a form soluble in an aqueous alkali metal hydroxide solution, in the presence of an alkali metal nitrate, with a limited amount of an aqueous alkali metal hydroxide solution of a concentration such that a substantially solid reaction mixture containing an alkali metal stannate is formed, and leaching the stannate from the reaction mixture.

IRVING E. MUSKAT.

REFERENCES CITED

The following references are of record in the file of this patent:

UNITED STATES PATENTS

| Number | Name | Date |
|---|---|---|
| 1,902,735 | Tamaru | Mar. 21, 1933 |
| 1,018,734 | Weber | Feb. 27, 1912 |
| 859,566 | Leitch | July 9, 1907 |
| 883,589 | Thirot | Mar. 31, 1908 |
| 1,511,590 | Buttfield | Oct. 14, 1924 |
| 2,055,732 | Schertel | Sept. 29, 1936 |

FOREIGN PATENTS

| Number | Country | Date |
|---|---|---|
| 984 | Great Britain | 1853 |
| 9,821 | Great Britain | 1889 |
| 10,309 | Great Britain | 1906 |
| 614 | Great Britain | 1915 |

OTHER REFERENCES

"Tin," by C. L. Mantell, The Chemical Catalog Co., New York, 1929; pp. 123, 124, 130, 133, 138, 143, 144, 265, 339, 340.